US006575658B2

United States Patent
Daniel et al.

(10) Patent No.: US 6,575,658 B2
(45) Date of Patent: Jun. 10, 2003

(54) ASSEMBLING A STEERING COLUMN BRACKET WITH A STEERING GEAR OF AN AUTOMOBILE VEHICLE

(75) Inventors: Philippe Daniel, Vendome (FR); Pascal Goulay, Vendome (FR); Pascal Monteil, Vendome (FR)

(73) Assignee: Nacam France SA, Vendome (FR)

( * ) Notice: Subject to any disclaimer, the term of this patent is extended or adjusted under 35 U.S.C. 154(b) by 0 days.

(21) Appl. No.: 10/093,823

(22) Filed: Mar. 11, 2002

(65) Prior Publication Data

US 2002/0131820 A1 Sep. 19, 2002

(30) Foreign Application Priority Data

Mar. 14, 2001 (FR) .............................................. 01 03489

(51) Int. Cl.⁷ ................................ F16B 7/04; F16D 3/16
(52) U.S. Cl. ....................... 403/316; 411/175; 464/134; 403/21; 403/376
(58) Field of Search ................................. 411/174, 175, 411/112; 464/134, 135, 901; 403/12, 13, 14, 22, 21, 290, 373, DIG. 14, 316, 317, 155, 376; D8/397

(56) References Cited

U.S. PATENT DOCUMENTS

| 4,537,523 | A | * | 8/1985 | Haldric | .......................... 403/12 |
| 4,900,178 | A |  | 2/1990 | Haldric et al. | |
| 5,090,833 | A | * | 2/1992 | Oertle et al. | ................... 403/12 |
| 5,253,949 | A | * | 10/1993 | Oxley et al. | ................. 403/317 |
| 5,503,374 | A | * | 4/1996 | Hellon | .......................... 267/281 |
| 6,155,739 | A | * | 12/2000 | Sekine et al. | .................. 403/12 |
| 6,443,650 | B2 | * | 9/2002 | Ikeda | ........................... 403/12 |
| 6,474,917 | B2 | * | 11/2002 | Gauron | ........................ 411/112 |

* cited by examiner

Primary Examiner—Lynne H. Browne
Assistant Examiner—Kenn Thompson
(74) Attorney, Agent, or Firm—Lawrence E. Laubscher, Sr.

(57) ABSTRACT

A device for assembling a steering column bracket with a steering gear shaft, comprising a clamping bolt cooperating with a clamping nut disposed in one of two branches of the bracket, the clamping nut being held in place against rotation and translation by an antirotation elastic member and having a radial protrusion. An axial prepositioning abutment is fastened to the bracket. When the radial protrusion of the clamping nut is pressed against the axial prepositioning abutment, the clamping nut is partly withdrawn along its axis to allow the bracket to be engaged over the end of the shaft. At the end of tightening the clamping bolt in the clamping nut, the clamping bolt neutralizes the antirotation function of the antirotation elastic member in order to allow the clamping nut to escape from the axial prepositioning abutment and immobilize the bracket on the shaft.

11 Claims, 9 Drawing Sheets

ASSEMBLING A STEERING COLUMN BRACKET WITH A STEERING GEAR OF AN AUTOMOBILE VEHICLE

BACKGROUND OF THE INVENTION

1. Field of the Invention

The present invention relates to a device for assembling a bracket with a shaft, and more particularly to a device for assembling a steering column bracket with a steering gear of an automobile vehicle, which device constitutes the connection of the steering column with the steering box.

2. Description of the Prior Art

There exist many devices for assembling a steering column with the gear of the steering box of an automobile vehicle. When the steering column has a bracket at the bottom, the bracket is very often equipped with a nut-and-bolt transverse to the axis of the bracket.

The nut-and-bolt clamps the two branches of the bracket against the shaft of the steering gear, pressing on each of the outside faces of the branches of said bracket. Assembly devices of the above type require an environment in the vehicle that enables easy access when mounting and clamping, and it is also necessary to provide special tools for correctly offering up the nut during mounting and insertion of the bolt, and which prevents the nut from rotating during tightening. Finally, assembly devices of the above type do not guarantee continuing clamping during use of the vehicle.

OBJECT OF THE INVENTION

The object of the present invention is to propose a device for assembling a steering column bracket with a steering gear which avoids the drawbacks described above and which allows particularly simple blind mounting in a confined space and without special tools and guarantees a permanent assembly.

SUMMARY OF THE INVENTION

One embodiment of the invention relates to a device for assembling a bracket to the end of a shaft which is engaged in the bracket. The device for assembling includes a system for clamping and immobilizing the shaft in the bracket, which system is constituted by a clamping bolt cooperating with a clamping nut along a clamping axis, in which device. In this configuration:

the clamping nut is disposed in one branch of two branches of the bracket;

the clamping bolt passes through the other branch of the bracket;

the clamping nut is held in place against rotation and translation along the clamping axis by an antirotation elastic member for pressing the clamping nut against the outside face of the branch of the bracket;

the outside periphery of the clamping nut is provided with a radial protrusion;

an axial prepositioning abutment is adapted to be fastened to the bracket;

when the radial protrusion of the clamping nut is pressed against the axial prepositioning abutment, the clamping nut is partly withdrawn along its axis to allow the bracket to be engaged over the end of the shaft; and the antirotation elastic member is adapted so that, at the end of tightening the clamping bolt in the clamping nut, the clamping bolt neutralizes the antirotation function of the antirotation elastic member in order to allow the clamping nut to escape from the axial prepositioning abutment and immobilize the bracket on the shaft.

According to an embodiment of the invention, the axial prepositioning abutment is integrated with the bearing antirotation elastic member. According to another embodiment of the invention, the axial prepositioning abutment is integrated with the bracket.

In a general structure of embodiment of the invention, the clamping nut includes:

a cylindrical body adapted to be mounted in a hole formed in a corresponding branch of the bracket;

a flange adapted to be pressed against the outside face of the branch of the bracket;

the radial protrusion, which is disposed at the periphery of the bearing flange, and which is pressed against the axial prepositioning abutment when engaging the bracket over the end of the shaft; and an inside cylindrical end which extends the cylindrical body into the housing of the bracket, the inside cylindrical end being eccentric to the cylindrical body so that the eccentric inside cylindrical end is on the opposite side of the shaft to the clamping axis when the clamping and immobilizing system is in an unlocked position;

so that at the end of tightening the clamping bolt in the clamping nut, and after neutralization of the antirotation function of the antirotation elastic member, the clamping nut can turn about the clamping axis and the eccentric inside cylindrical end can be pressed against a flap provided on the shaft.

According to a general structure of embodiment of the invention, the antirotation elastic member includes:

a connecting portion for connecting it to the bracket;

a bearing antirotation portion; and a flexible connecting portion connecting the bearing antirotation portion to the connecting portion to constitute a single member.

In a detailed structure of the antirotation elastic member:

the connecting portion of the antirotation elastic member has a U-shaped section with two branches and a connecting base so as to surround the external part of the bracket, each of the two branches having a curved end which is engaged in a housing formed on the corresponding branch of the bracket, and the connecting base including two bearing elastic tongues which are opposite each other in the axial direction;

the bearing antirotation portion of the antirotation elastic member includes two bearing antirotation tongues which are connected together by an end base; and the flexible connecting portion of the antirotation elastic member includes two flexible branches which are connected to the connecting base of the connecting portion and to the corresponding bearing antirotation tongue.

Advantageously, the axial prepositioning abutment is integrated with one of the branches of the connecting portion of the antirotation elastic member.

In a detailed structure of the antirotation elastic member:

the clamping nut includes:

a bearing cylindrical base, an antirotation portion which is an axial extension of the bearing cylindrical base and includes two flaps, the first flap and the second flap being substantially parallel to each other; and an external cylindrical end which axially extends the antirotation portion, the transverse overall size of the outside cylindrical end not exceeding the distance between the first flap and the second flap.

So that at rest, i.e. before clamping, the two bearing antirotation tongues of the bearing antirotation portion are pressed against the outside face of the bearing cylindrical base of the flange and at the end of clamping the end of the clamping bolt pushes back the end base which entrains the two bearing antirotation tongues in the axial direction to disengage them from the antirotation portion.

Advantageously, the eccentric inside cylindrical end of the clamping nut is provided with a face inclined to the clamping axis to enable insertion of the shaft in a direction parallel to the uprights of the bracket.

Furthermore, the inside cylindrical end of the nut is eccentric to the cylindrical body and the inside cylindrical end and the cylindrical body have a common generatrix on the opposite side of the shaft relative to the clamping axis when the clamping and immobilizing system is in an unlocked position.

A particularly interesting application of the invention refers to a steering column of an automobile vehicle and wherein the bracket is mounted on the steering column and the shaft is the shaft of the gear of the steering box.

The device in accordance with the invention for assembling a steering column bracket with a steering gear of an automobile vehicle therefore has the advantage of allowing mounting with the clamping nut held in position; this avoids all risk of loss and allows assembly blind in a restricted space. Also, the locked position with the nut immobilized against the shaft guarantees that the bracket is maintained in position on the shaft with the required tightness.

BRIEF DESCRIPTION OF THE DRAWINGS

Further features and advantages of the invention will be apparent from the following particular description of preferred embodiments of the invention shown in the corresponding accompanying drawings, in which.

DESCRIPTION OF THE PREFERRED EMBODIMENTS

Figure 2:
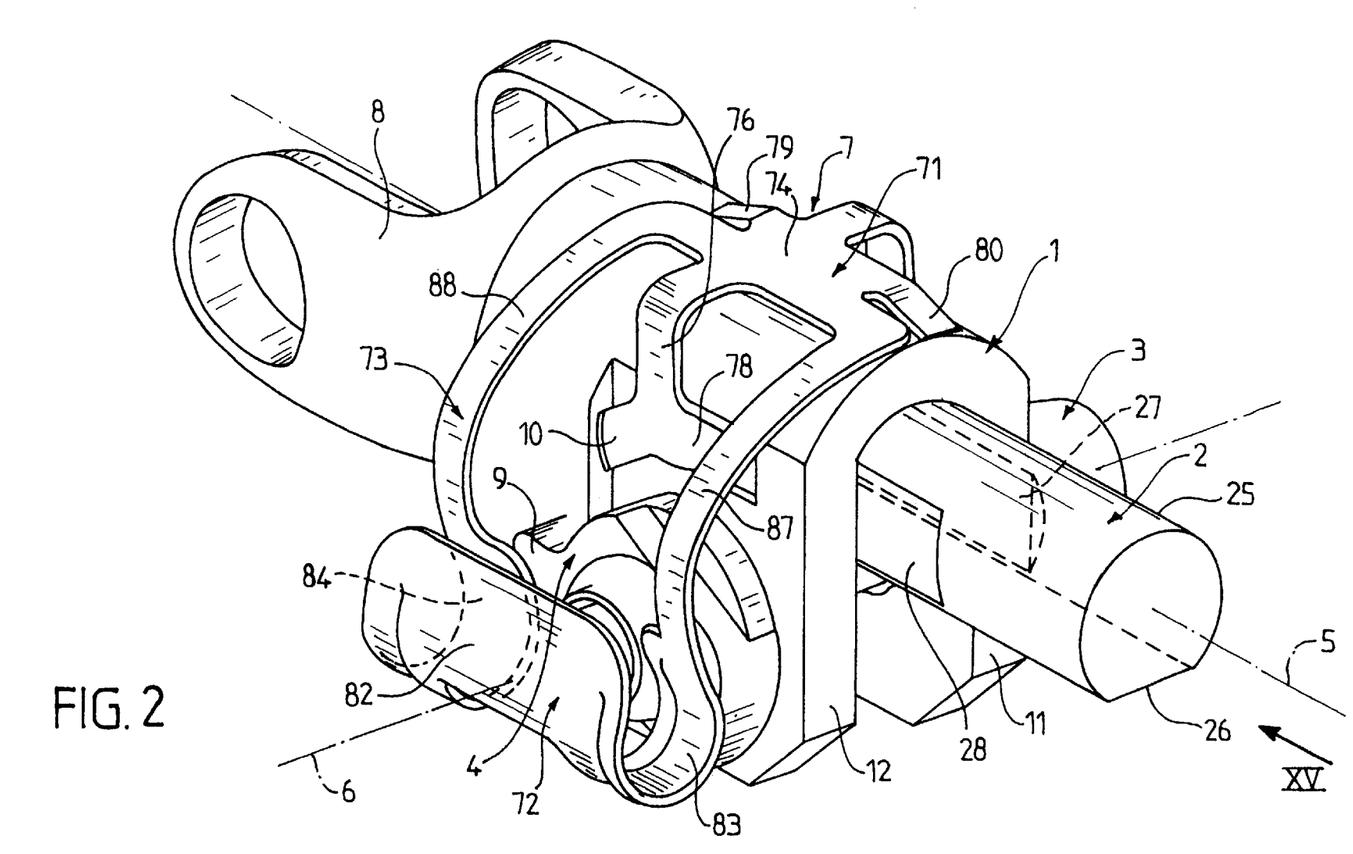
FIG. 2 is a perspective view analogous to FIG. 1 at the end of assembly of the bracket to the shaft, after immobilizing and clamping.
Figure 15:
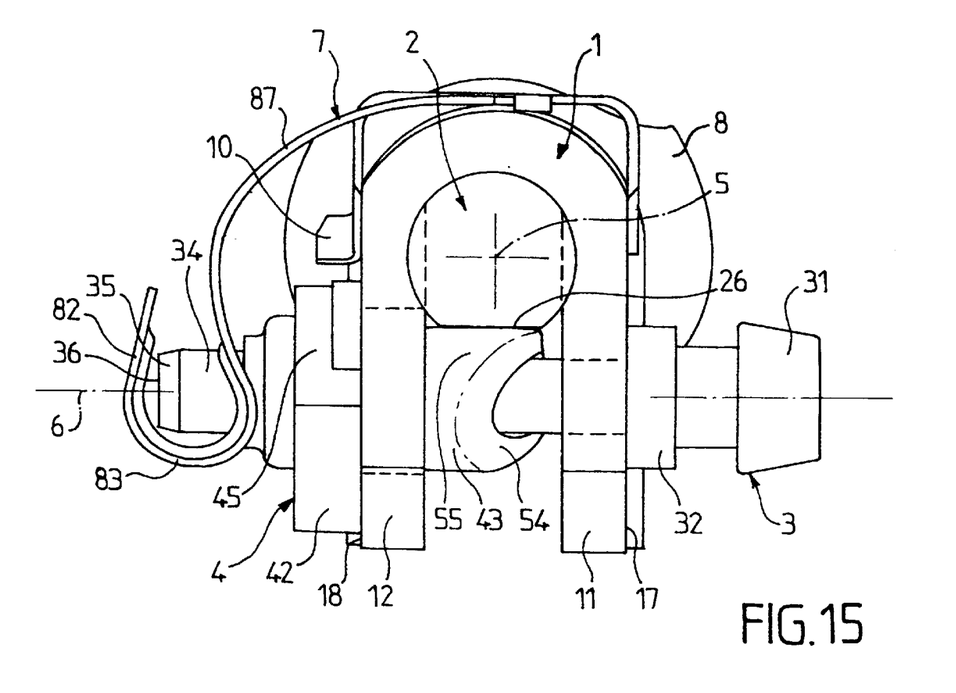
FIG. 15 is a view in the direction of the arrow XV in FIG. 2 after immobilizing and clamping the bracket and the shaft.

The device of the invention relates to assembling a bracket 1 with a shaft 2 like that shown in FIGS. 2 and 15. In one particularly beneficial application of the invention, which relates to a steering column of an automobile vehicle, the bracket 1 is mounted on said steering column and the shaft 2 is the shaft of the steering box gear. In accordance with the invention, the assembly device, which connects the bracket 1 of the steering column to the shaft 2 of the steering gear, includes a system for clamping and immobilizing the shaft 2 in the bracket 1. The clamping and immobilizing system is essentially constituted by a clamping bolt 3 which cooperates with a clamping nut 4 along a clamping axis 6.

The bottom end of the steering column as a whole, which is not shown in the figures, carries a universal joint 8. The universal joint 8 is fastened to the steering column and to the bracket 1.

The steering gear has an axis 5 which is also the axis of the shaft 2. The axis 5 is therefore the axis of assembling the bracket 1 onto the shaft 2.

Figure 9:
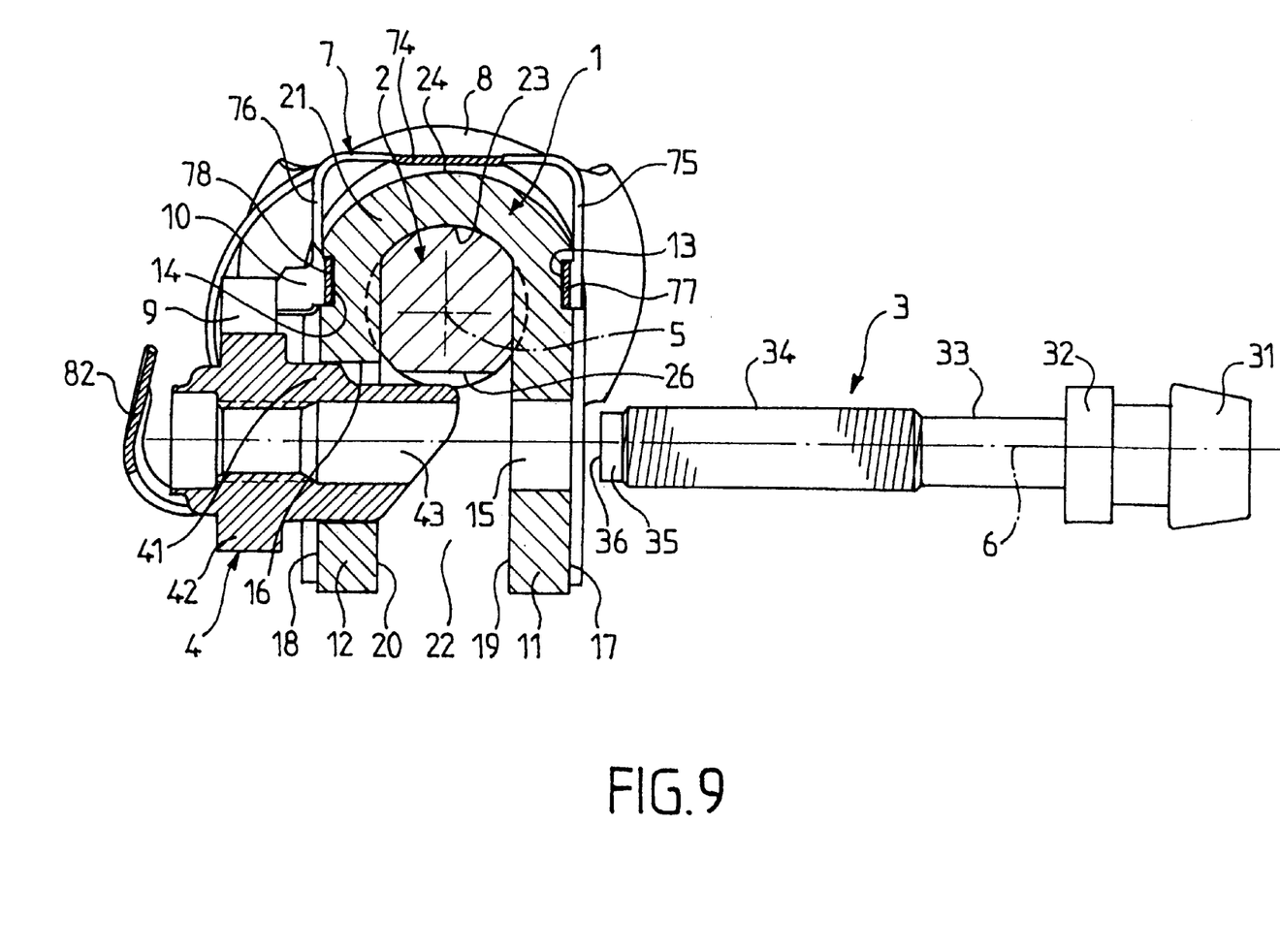
FIG. 9 is a view in cross section analogous to FIG. 8 and showing the clamping bolt.

As shown in FIG. 9 in particular, the bracket 1 has a U-shaped cross section (relative to the axis 5). The bracket 1 is constituted of two substantially parallel branches 11 and 12. The branches 11 and 12 are connected to each other by a connecting portion 21 whose section is substantially a circular half-ring. The branches 11 and 12 and the connecting portion 21 constitute the housing 22 of the bracket 1. The connecting portion 21 has an outside face 24 and an inside face 23 which constitutes the bottom of the housing 22 of the bracket 1. The inside face 23 is curved (substantially semicircular) and its dimension is similar to the circular section of the shaft 2. In the remainder of the description terms like "inside" refer to an element or portion that is closer to a plane passing through the axis 5 and parallel to the branches 11 and 12 and terms like "outside" refer to an element that is farther away from the plane of the axis 5.

The branch 11 has an outside face 17 and an inside face 19 and the branch 12 has an outside face 18 and an inside face 20. A housing 13 is formed on the outside face 17 and a housing 14 is formed on the outside face 18. The branch 11 is provided with a hole 15 through which the clamping bolt 3 passes and the branch 12 includes a hole 16 that constitutes a housing and a support for the clamping nut 4. The holes 15 and 16 are aligned with the clamping axis 6, which is substantially perpendicular to the branches 11 and 12, to be more precise to the outside faces 17 and 18 and to the inside faces 19 and 20.

The shaft 2 has a circular section with a cylindrical face 25 (see FIG. 2). A first flat 27 and a second flat 28 are provided on the shaft 2, and they are substantially parallel to each other. The thickness of the shaft 2 between the two flaps 27 and 28 is substantially similar to (slightly less than) the distance between the two inside faces 19 and 20 of the branches 11 and 12.

A third flat 26 substantially perpendicular to the first flap 27 and to the second flap 28 is provided on the shaft 2.

The clamping bolt 3 has a body 33 with a head 31 with a flange 32 at one end.

At the other end the body 33 has a threaded portion 34 with an endpiece 35 provided with a transverse face 36.

The hole 15 in the branch 11 has dimensions such that the threaded portion 34 of the clamping screw 3 can pass freely through it, with the flange 32 pressed against the outside face 17 of the branch 11.

The clamping nut 4 has a cylindrical body 41 which is mounted in the hole 16 in the branch 12 of the bracket 1. The dimensions of the hole 16 are such that the cylindrical body 41 fits correctly in the hole 16 in the branch 12, which supports the clamping nut 4. The cylindrical body 41 is extended by an internal cylindrical end 43 that penetrates into the housing 22 of the bracket 1.

The cylindrical body 41 is extended on the outside of the branch 12 by a bearing flange 42 which is pressed against the outside face 18 of said branch 12.

Thus in the assembly device of the invention the clamping nut 4 is disposed in one of the two branches 12 of the bracket 1 and the clamping bolt 3 passes through the other branch 11 of the bracket 1.

According to one feature of the invention, the clamping nut 4 is held in place against rotation and against translation along the clamping axis 6 when the clamping and immobilizing system is in an unlocked position. As shown in FIG. 9, it is held in place against rotation and translation by an antirotation elastic member 7 bearing the clamping nut 4.

According to another feature of the invention, the clamping nut 4 is provided with a radial protrusion 9 at its outside periphery. An axial prepositioning abutment 10 is adapted to be fastened to the bracket 1.

The radial protrusion 9 and the axial prepositioning abutment 10 are designed and disposed so that, when the radial protrusion 9 on the clamping nut 4 presses against the axial prepositioning abutment 10, said clamping nut 4 is partly withdrawn along its axis 6 to allow the bracket 1 to be engaged over the end of the shaft 2.

Figure 13:
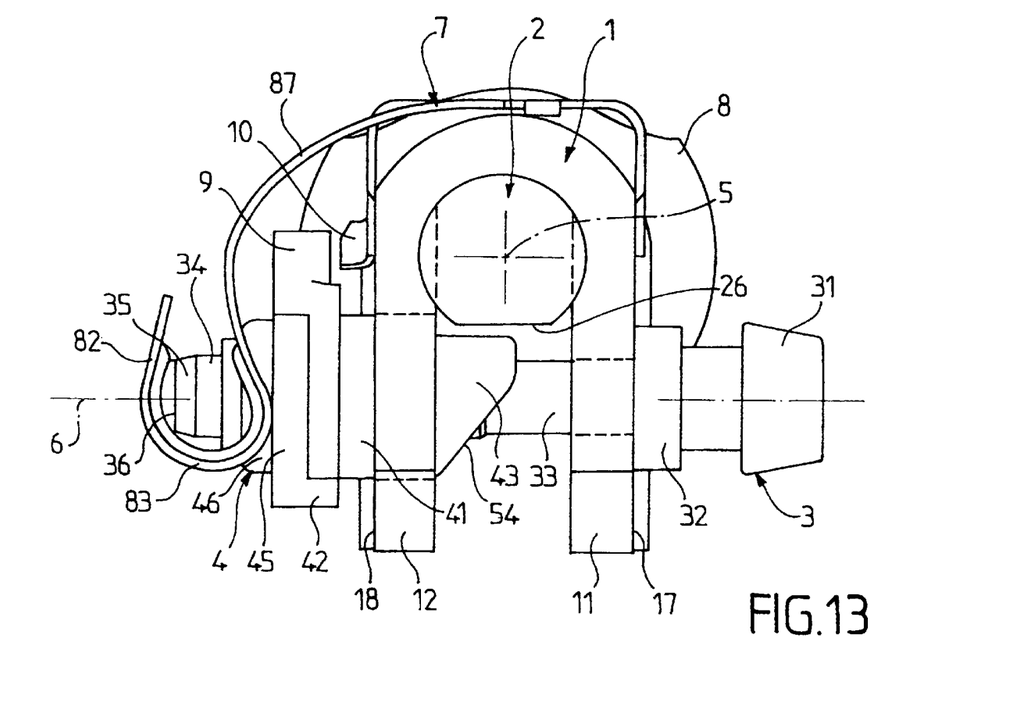
FIG. 13 is a view in the direction of the arrow XIII in FIG. 12.
Figure 14:
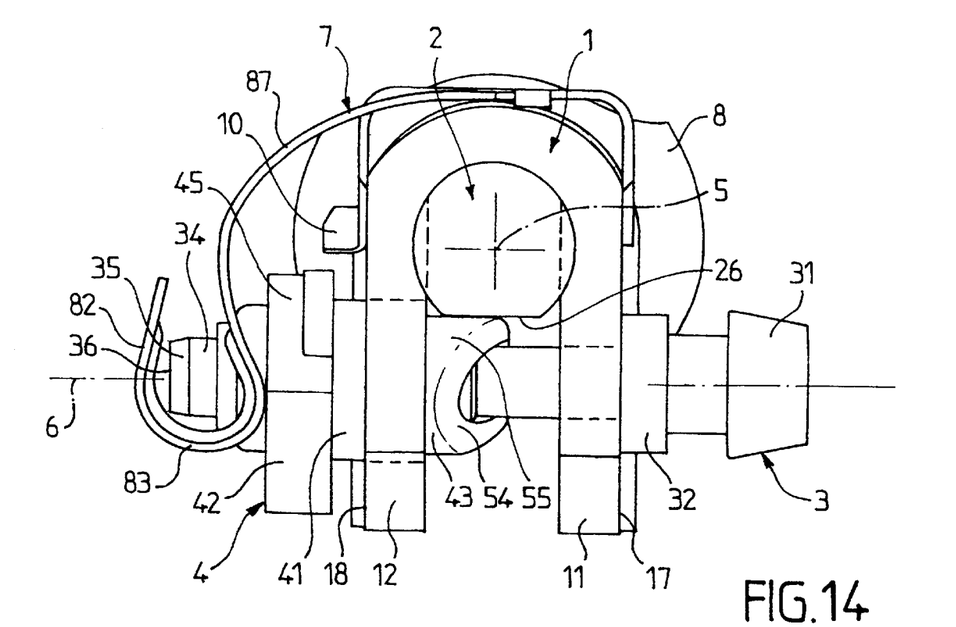
FIG. 14 is a view analogous to FIG. 13 with the clamping nut at the beginning of antirotation by action on the shaft.

The antirotation elastic member 7 is such that at the end of tightening the clamping bolt 3 in the clamping nut 4, said clamping bolt 3 neutralizes the antirotation function of the antirotation elastic member 7 (see FIGS. 12 and 13), to allow the clamping nut 4 to escape from the axial prepositioning abutment 10 and immobilize the bracket 1 on the shaft 2, as shown in FIGS. 14, 2 and 15.

Figures 1, 1A:
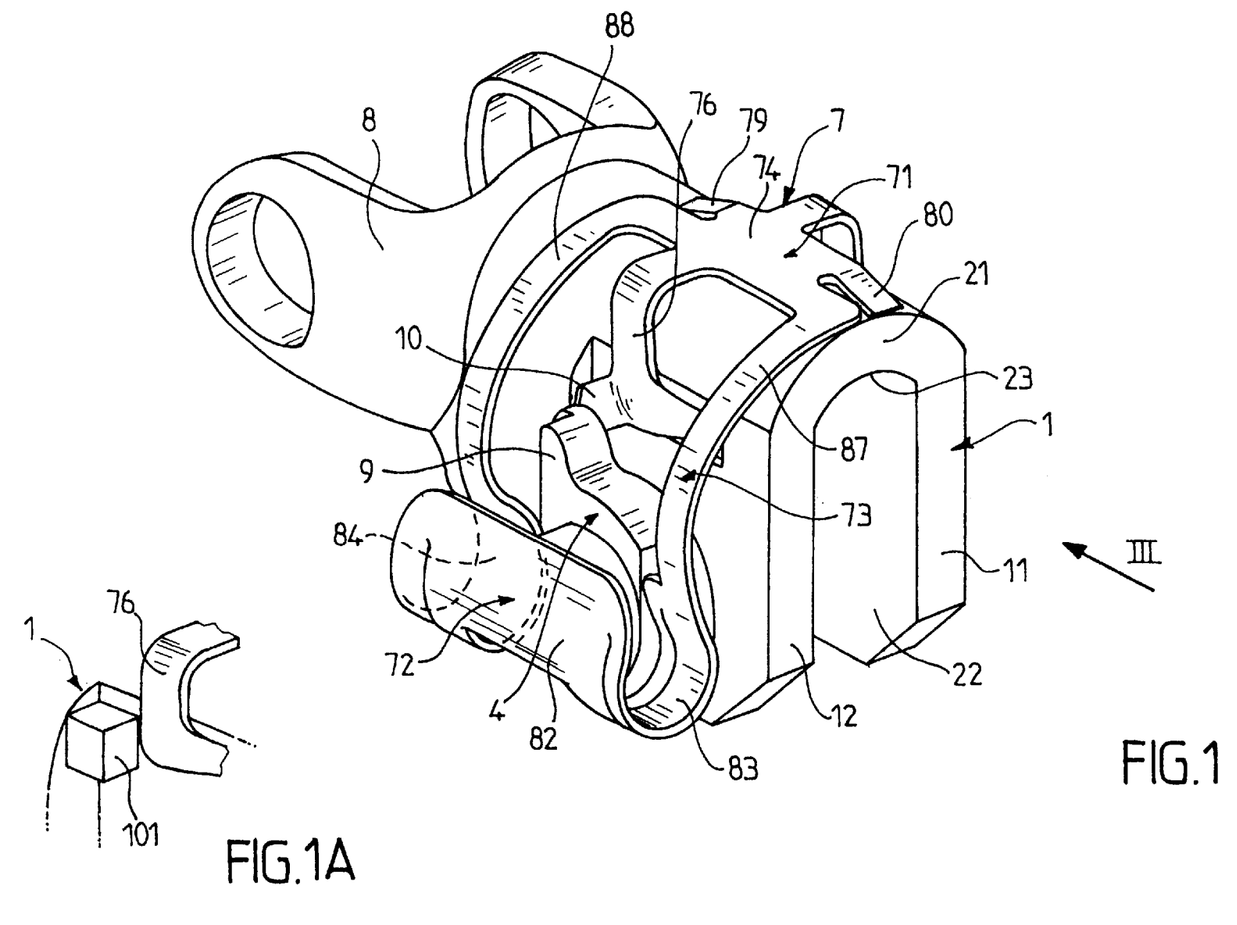
FIG. 1 is a perspective view of a bracket with a clamping nut and an antirotation elastic member of an assembly device according to the invention, showing the equipped bracket ready to be mounted on the shaft.
FIG. 1A is a partial view of FIG. 1 relating to a variant.

In one embodiment of the invention, shown in FIG. 1A, the axial prepositioning abutment 101 is integrated into the bracket 1.

In another embodiment of the invention, shown in all the other figures, the axial prepositioning abutment 10 is integrated into the antirotation elastic member 7.

The antirotation elastic member 7, which is shown in the various figures, includes:

a portion 71 for connecting it to the bracket 1;

a bearing antirotation portion 72; and a flexible connecting portion 73 connecting the bearing antirotation portion 72 to the connecting portion 71 to constitute a single part.

As shown in FIGS. 1, 2 and 9 in particular, the connecting portion 71 of the antirotation elastic member 7 has a U-shaped section comprising two branches 75, 76 and a connecting base 74 and surrounds the outside part of the bracket. Each of the two branches 75, 76 has a curved end 77, 78 that engages in a housing 13, 14 on the corresponding branch 11, 12 of the bracket 1. The connecting base 74 includes two bearing elastic tongues 79 and 80 which are opposite each other in the axial direction.

The bearing antirotation portion 72 of the antirotation elastic member 7 includes two bearing antirotation tongues 83 and 84 joined together by an end base 82.

The flexible connecting portion 73 of the bearing antirotation elastic member has two flexible branches 87 and 88 which are connected, on the one hand, to the connecting base 74 of the connecting portion 71 and, on the other hand, to the corresponding bearing antirotation tongue 83, 84.

The axial prepositioning abutment 10 is integrated with the branch 76 of the connecting portion 71 of the antirotation elastic member 7.

Figure 4:
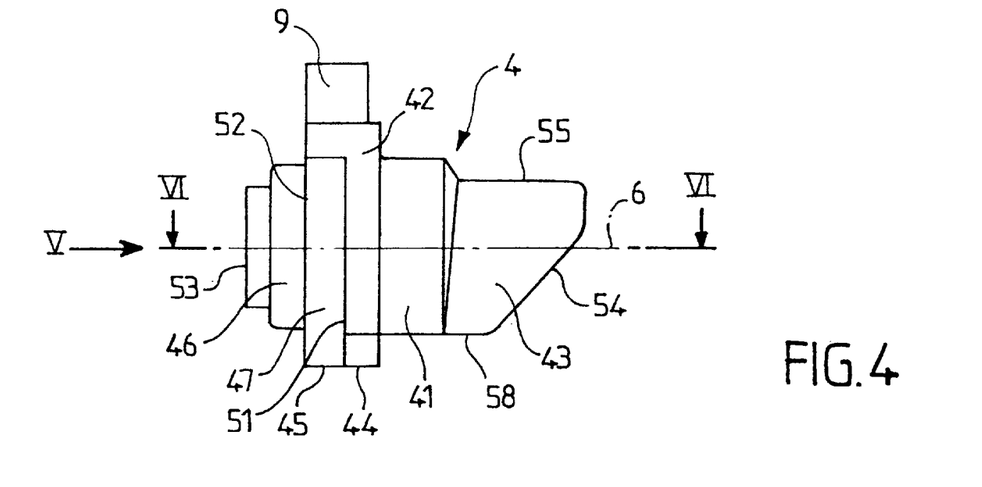
FIG. 4 is a view of the clamping nut mounted in the bracket shown in FIG. 1.
Figure 5:
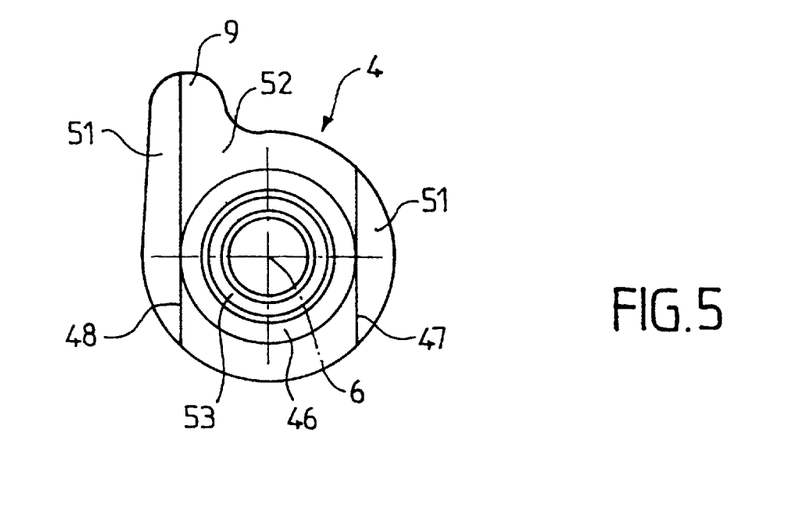
FIG. 5 is a view in the direction of the arrow V in FIG. 4.
Figure 6:
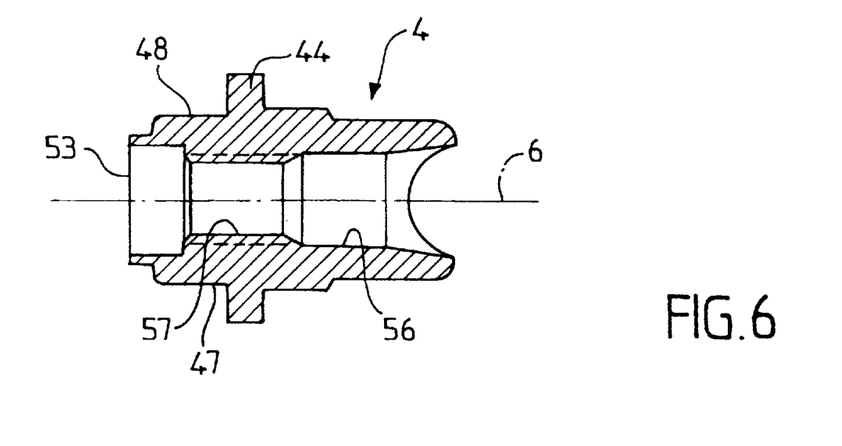
FIG. 6 is a view in axial section taken along the line VI—VI in FIG. 4.

The detailed structure of the clamping nut 4 is shown particularly clearly in FIGS. 4, 5 and 6. In that structure, the clamping nut 4 includes:

a cylindrical body 41, which is mounted in the hole 16 formed in the corresponding branch 12 of the bracket 1;

a bearing flange 42 against the outside face 18 of said branch 12 of the bracket 1;

the radial protrusion 9, which is at the periphery of the bearing flange 42 and pressed against the axial prepositioning abutment 10 when engaging the bracket 1 over the end of the shaft 2; and the inside cylindrical end 43 which extends said cylindrical body 41 into the housing 22 of the bracket 1.

The clamping nut 4 has a threaded hole 57 which cooperates with the threaded portion 34. A hole 56 allows the clamping bolt 3 to be inserted into the clamping nut 4. The cylindrical inside end 43 has a cylindrical surface 55 which is eccentric with respect to said cylindrical body 41, so that said eccentric inside cylindrical end 43 is on the opposite side of the shaft 2 to the clamping axis 6 when the clamping and immobilizing system is in the unlocked position (see FIGS. 8 and 9)

This eccentricity is so that at the end of tightening the clamping bolt 3 in the clamping nut 4, and after neutralizing the antirotation function of the antirotation elastic member 7, said clamping nut 4 can turn about the clamping axis 6 and the eccentric inside cylindrical end 43 presses against the flap 26 provided on the shaft 2 (see FIGS. 14 and 15).

In this structure, the flange 42 of the clamping nut 4 includes:

a cylindrical bearing base 44, an antirotation portion 45, and an outside cylindrical end 46.

The antirotation portion 45 is the axial extension of said bearing cylindrical base 44. Said antirotation portion 45 includes two flaps 47, 48: the first flap 47 and the second flap 48 are substantially parallel to each other.

The outside cylindrical end 46 axially extends the antirotation portion 45 and the overall transverse size of said outside cylindrical end 46 does not exceed the distance between the first flap 47 and the second flap 48. The cylindrical bearing base 44 has an outside face 51 against which the two bearing antirotation tongues 83 and 84 are pressed. The antirotation portion 45 has an outside face 52 which must be disengaged at the end of clamping by the bearing antirotation portion 72.

This portion is arranged so that, at rest, i.e. before clamping, the two bearing antirotation tongues 83, 84 of the bearing antirotation portion 72 are pressed against the outside face 51 of the cylindrical bearing base 44 of the flange 42.

Figure 12:
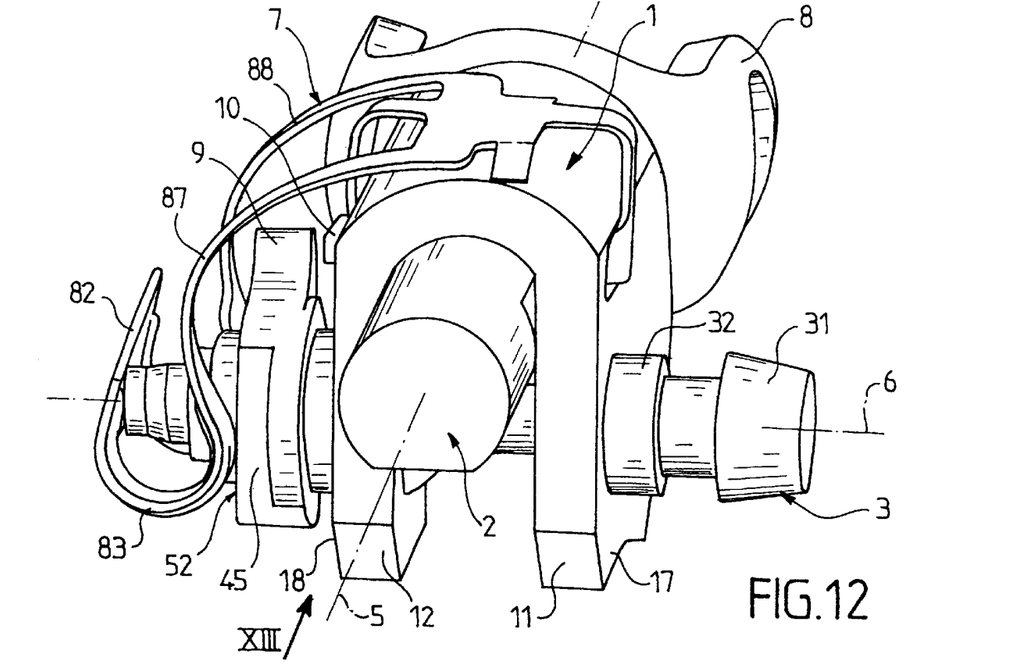
FIG. 12 is a perspective view after disengagement of the antirotation of the clamping nut by the clamping bolt.

This portion is also arranged so that, at the end of clamping, the transverse face 36 of the end 35 of the clamping bolt 3 pushes back the end base 82, which entrains the two antirotation tongues 83, 84 in the axial direction to disengage them from the outside face 52 of the antirotation portion 45 (see FIGS. 12 and 13).

In the embodiment shown in the various figures, the inside cylindrical end 43 of the nut 4 is eccentric with respect to the cylindrical body 41, and said inside cylindrical end 43 and said cylindrical body 41 have a common generatrix 58 which is on the opposite side of the shaft 2 to the clamping axis 6 when the clamping and immobilizing system is in the unlocked position (see FIG. 9).

The eccentric inside cylindrical end 43 of the clamping nut 4 is provided with a face 54 inclined to the clamping axis 6 to enable insertion of the shaft 2 in a direction parallel to the uprights 11, 12 of the bracket 1.

Accordingly, to mount the bracket 1 on the shaft 2, the antirotation elastic member 7 equipped with the clamping nut 4, which is engaged in the hole 16 in the branch 12 of the bracket 1, must first be disposed on the bracket 1. During this operation, the clamping nut 4 is held in position by its flaps 47 and 48, which receive the bearing antirotation tongues 83 and 84 pressed against the outside face 51 of the bearing cylindrical base 44.

Figure 3:
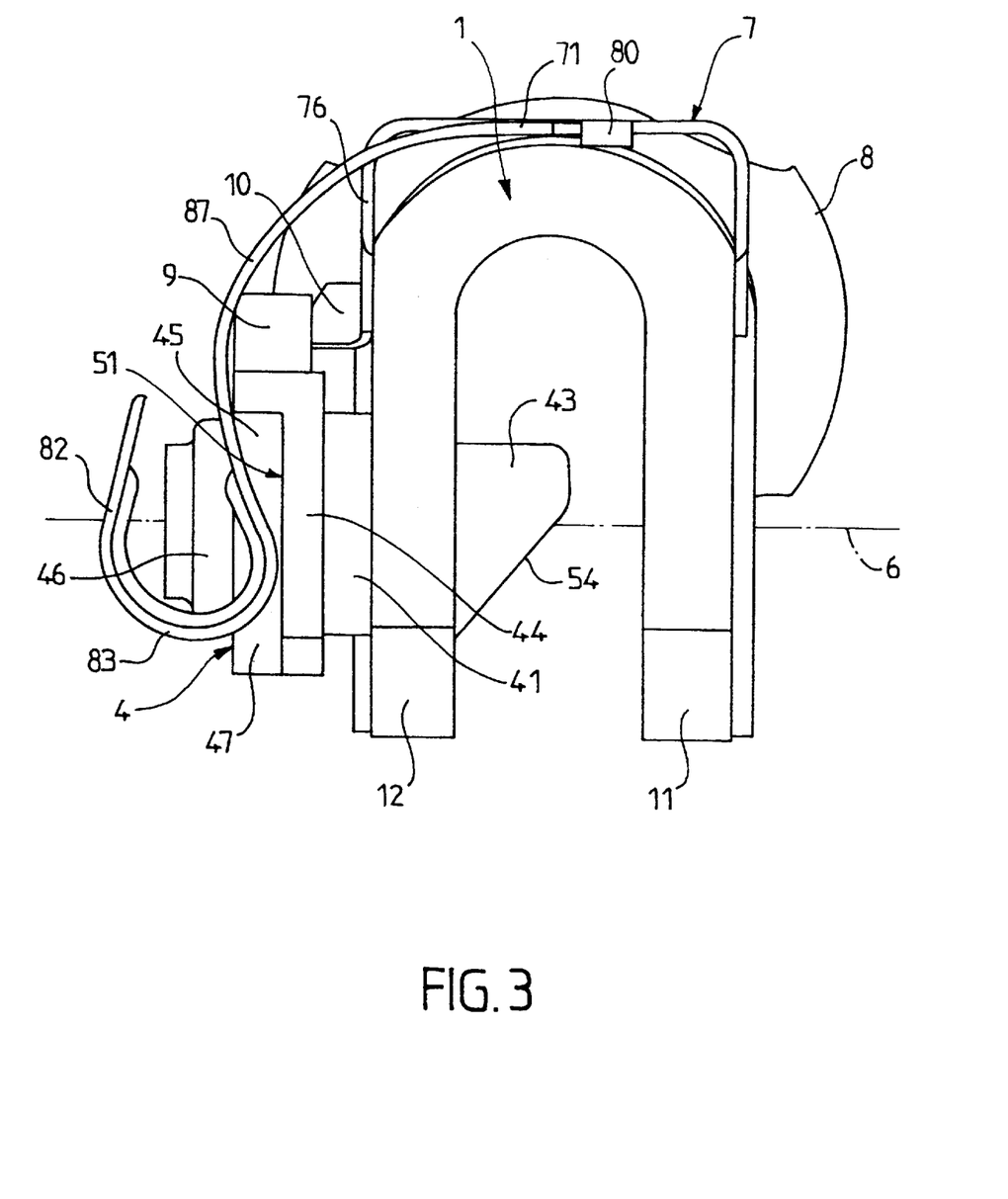
FIG. 3 is a view in the direction of the arrow III in FIG. 1.

The nut is inserted into the bracket until the radial protrusion 9 is pressed against the axial prepositioning abutment 10 or 101, as shown in FIGS. 1 and 3.

Figure 7:
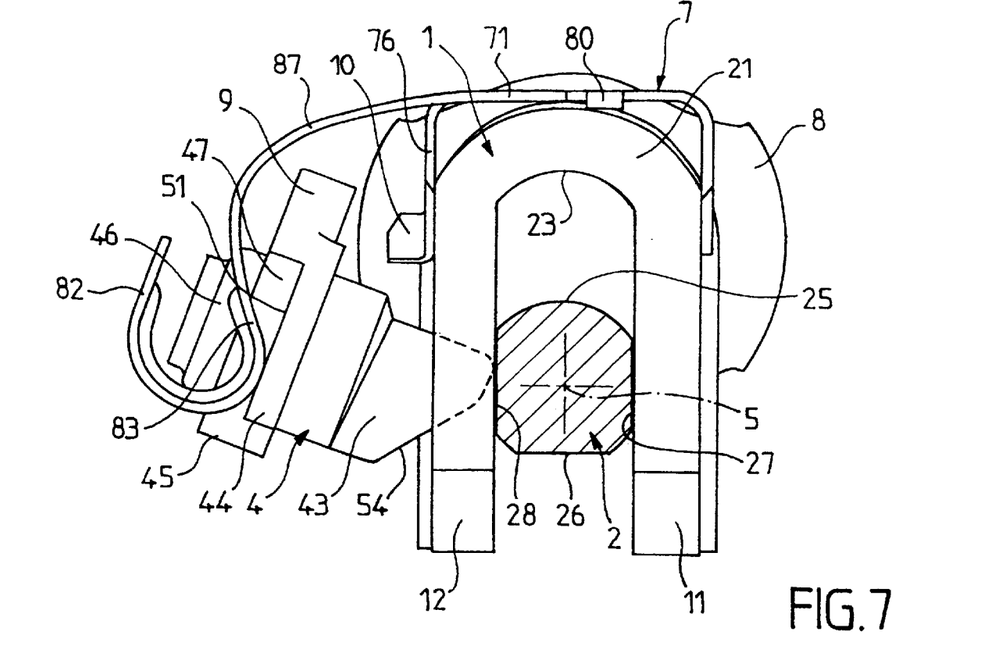
FIG. 7 is a view analogous to FIG. 3 in the phase of engaging the bracket over the shaft, shown in cross section.
Figure 8:
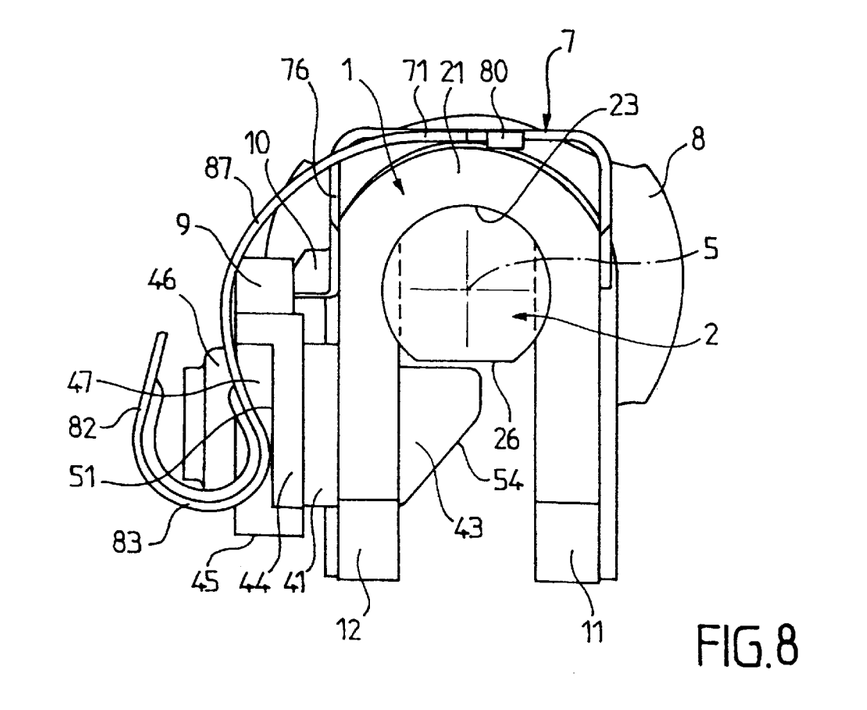
FIG. 8 is a view analogous to FIG. 3 at the end of engaging the bracket over the shaft.

The bracket 1 equipped in this way is engaged over the shaft 2, as shown in FIG. 7. The shaft 2 pushes back the inclined face 54 of the eccentric inside cylindrical end 43. The clamping nut 4 is pulled outwards by virtue of the flexibility of the antirotation elastic member 7, and allows the shaft 2 to pass it, so that it is pressed against the inside face 23 of the connecting portion 21. The clamping nut 4 then returns to the preceding position, pressed against the axial prepositioning abutment 10, as shown in FIG. 8. The clamping bolt 3 is then offered up along the clamping axis 6, as shown in FIG. 9.

Figure 10:
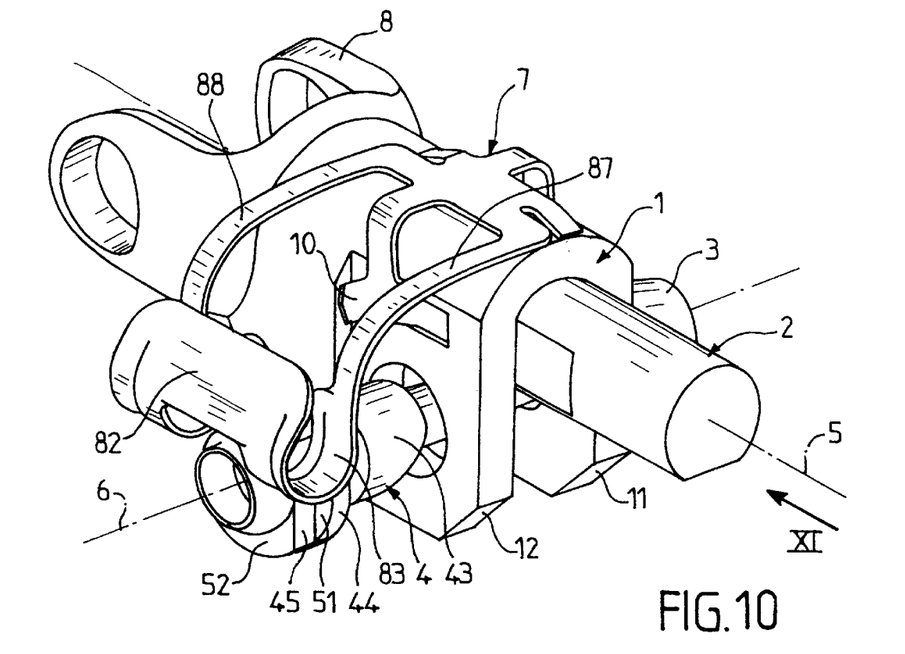
FIG. 10 is a perspective view analogous to FIG. 1 after engaging the clamping bolt in the bracket.
Figure 11:
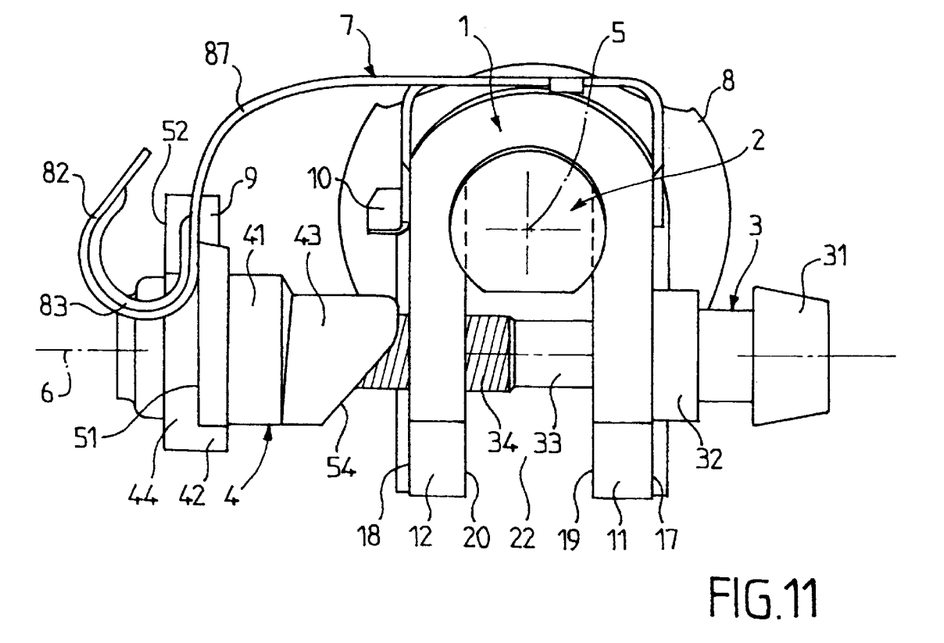
FIG. 11 is a view in the direction of the arrow XI in FIG. 10.

The clamping bolt 4 is then inserted into the to branches 11 and 12 and into the hole 56 through the clamping nut 4 until the flange 32 is pressed against the outside face 17. During this operation, the clamping bolt 3 pushes the clamping nut backward out of the bracket 1, as shown in FIGS. 10 and 11.

The clamping bolt 3 is then screwed into the threaded hole 57 in the clamping nut 4, which moves toward the branch 12 until the bearing antirotation tongues 83 and 84 escape from the antirotation portion 45 of the clamping nut 4 (see FIGS. 12 and 13). This disengagement is effected by virtue of the action of the transverse face 36 of the end 35 of the clamping bolt 3, which pushes back the end base 82, entraining the bearing antirotation tongues 83 and 84.

The clamping bolt 3 then rotates the clamping nut 4 with its inside end 43, which is pressed against the flap 26 on the shaft 2; in turning, the radial protrusion 9 of the clamping nut 4 is disengaged from the prepositioning abutment 10, as shown in FIG. 14.

The clamping nut 4 being immobilized against rotation, the clamping bolt 3, in turning, moves toward the clamping nut 4 to press its flange 42 against the outside face 18. The clamping bolt 3 is finally turned until the required tightness is obtained, as shown in FIGS. 2 and 15.

What is claimed is:

1. A device for assembling a bracket with the end of a shaft having an axis and that is inserted in said bracket, which assembly device includes a system for clamping and immobilizing said shaft in said bracket, which system is constituted by a clamping bolt cooperating with a clamping nut along a clamping axis, in which device:

said clamping nut is disposed in one branch of two branches of said bracket;

said clamping bolt passes through the other branch of said bracket;

said clamping nut is held in place against rotation and translation along said clamping axis by an antirotation elastic member for pressing said clamping nut against the outside face of said branch of said bracket;

the outside periphery of said clamping nut is provided with a radial protrusion;

an axial prepositioning abutment is adapted to be fastened to said bracket;

when said radial protrusion of said clamping nut is pressed against said axial prepositioning abutment, said clamping nut is partly withdrawn along its axis to allow said bracket to be engaged over the end of said shaft; and said antirotation elastic member is adapted so that, at the end of tightening said clamping bolt in said clamping nut, said clamping bolt neutralizes the antirotation function of said antirotation elastic member in order to allow said clamping nut to escape from said axial prepositioning abutment and immobilize said bracket on said shaft.

2. The assembly device claimed in claim 1 wherein said axial prepositioning abutment is integrated with said antirotation elastic member.

3. The assembly device claimed in claim 1 wherein said axial prepositioning abutment is integrated with said bracket.

4. An assembly device as claimed in claim 1 wherein said clamping nut includes:

a cylindrical body adapted to be mounted in a hole formed in a corresponding branch of said bracket;

a bearing flange adapted to be pressed against said outside face of said branch of said bracket;

said radial protrusion, which is disposed at the periphery of said bearing flange, and which is pressed against said axial prepositioning abutment when engaging said bracket over the end of said shaft; and an inside cylindrical end which extends said cylindrical body into said housing of said bracket, said inside cylindrical end being eccentric to said cylindrical body so that said eccentric inside cylindrical end is on the opposite side of said shaft to said clamping axis when said clamping and immobilizing system is in an unlocked position;

so that at the end of tightening said clamping bolt in said clamping nut, and after neutralization of the antirotation function of said antirotation elastic member, said clamping nut can turn about said clamping axis and said eccentric inside cylindrical end can be pressed against a flap provided on said shaft.

5. The assembly device claimed in claim 1, wherein said antirotation elastic member includes:

a connecting portion for connecting it to said bracket;

a bearing antirotation portion; and a flexible connecting portion connecting said bearing antirotation portion to said connecting portion to constitute a single member.

6. The assembly device claimed in claim 5, wherein:

said connecting portion of said antirotation elastic member has a U-shaped section with two branches and a connecting base so as to surround the external part of said bracket, each of said two branches having a curved end which is engaged in a housing formed on the corresponding branch of said bracket, and said connecting base including two bearing elastic tongues which are opposite each other in the axial direction;

said bearing antirotation portion of said antirotation elastic member includes two bearing antirotation tongues which are connected together by an end base; and said flexible connecting portion of said antirotation elastic member includes two flexible branches which are connected to said connecting base of said connecting portion and to the corresponding bearing antirotation tongue.

7. The assembly device claimed in claim 6 wherein said axial prepositioning abutment is integrated with said branch of said connecting portion of said antirotation elastic member.

8. The assembly device claimed in claim 6 wherein said flange of said clamping nut includes:

a bearing cylindrical base, an antirotation portion which is an axial extension of said bearinq cylindrical base and includes two flaps, the first flap and the second flap being substantially parallel to each other; and an external cylindrical end which axially extends said antirotation portion, the transverse overall size of said outside cylindrical end not exceeding the distance between said first flap and said second flap, so that at rest, before clamping, said two bearing antirotation tongues of said bearing antirotation portion are pressed against the outside face of said bearing cylindrical base of said flange and at the end of clamping the end of said clamping bolt pushes back said end base which entrains said two bearing antirotation tongues in the axial direction to disengage them from said antirotation portion.

9. The assembly device claimed in claim 1 wherein said eccentric inside cylindrical end of said clamping nut is provided with a face inclined to said clamping axis to enable insertion of said shaft in a direction parallel to the uprights of said bracket.

10. The assembly device claimed in claim 1 wherein said inside cylindrical end of said nut is eccentric to said cylindrical body and said inside cylindrical end and said cylindrical body have a common generatrix on the opposite side of said shaft relative to said clamping axis when said clamping and immobilizing system is in an unlocked position.

11. The assembly device claimed in claim 1 when applied to a steering column of an automobile vehicle and wherein said bracket is mounted on said steering column and said shaft is the shaft of a gear of a steering box.

* * * * *